United States Patent Office 3,073,023
Patented Jan. 15, 1963

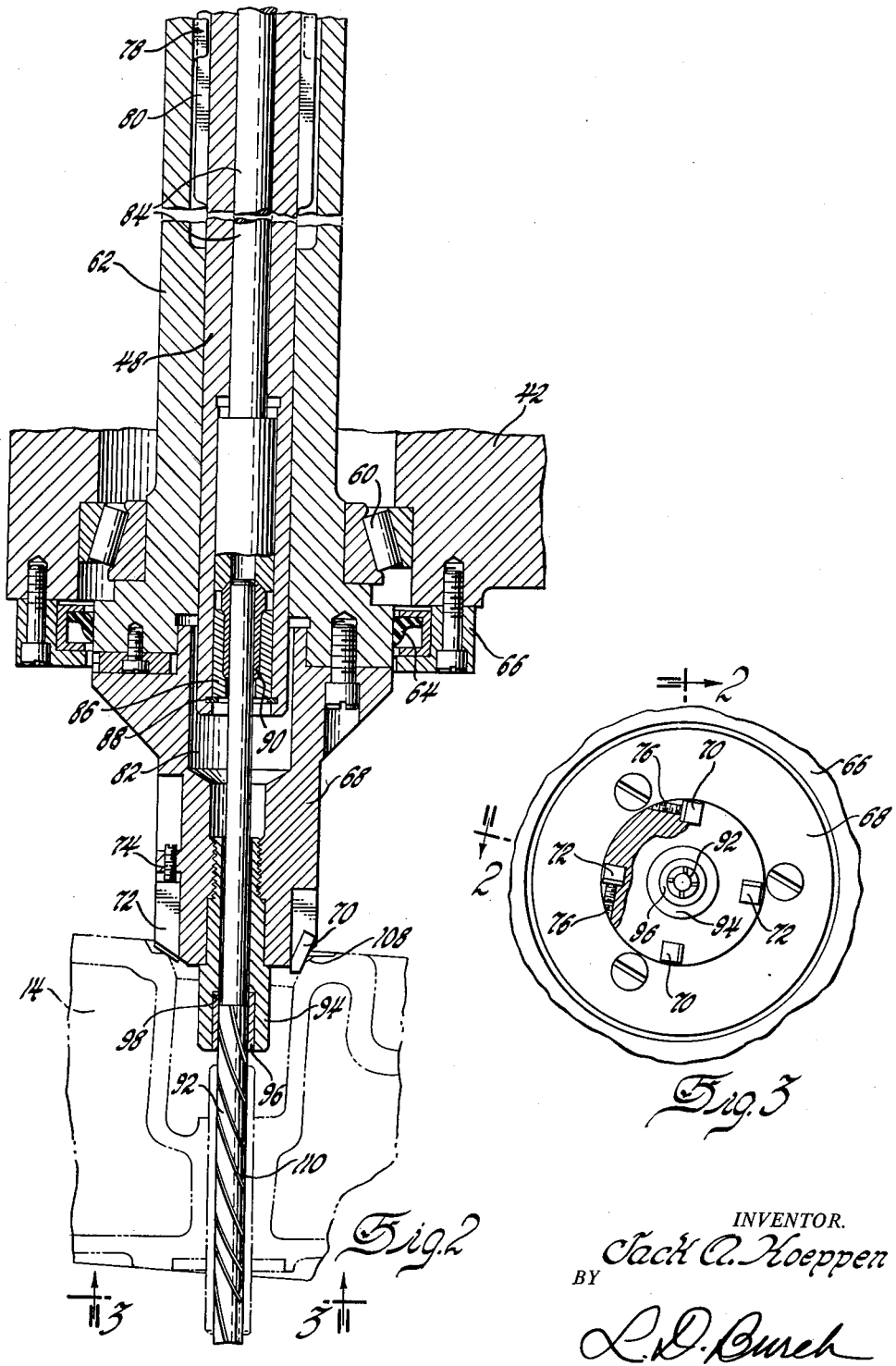

3,073,023
VALVE SEAT AND GUIDE FINISHING MACHINE
Jack A. Koeppen, Linden, Mich., assignor to General Motors Corporation, Detroit, Mich., a corporation of Delaware
Filed Sept. 4, 1956, Ser. No. 607,737
1 Claim. (Cl. 29—566)

This invention relates to a tool for finishing valve seats and reaming valve stem guides in a single operation. In the past it has been difficult to finish valve seats and ream valve stem guide holes while maintaining a reasonable degree of concentricity about a common center line. The cylinder head has usually been placed in a first machine in which the valve stem guide holes were reamed. The head was then moved to the next station for the seating of the inlet and exhaust valve openings. Following these operations it has heretofore been necessary to maintain a crew of operators who hand ground each valve seat with a tool which piloted in the valve stem guide hole to assure the concentricity of the finished valve seats with respect to the valve guide holes. A machine incorporating this invention eliminates the need of the final hand grinding operation and the use of separate stations for the reaming and seat finishing operations by machining both areas without movement of the cylinder head.

In the drawings:

FIGURE 2 is a cross-sectional view of the finisher spindle housing and reamer mechanism.

FIGURE 3 is an end view taken along lines 3—3 of FIGURE 2.

Figure 1:
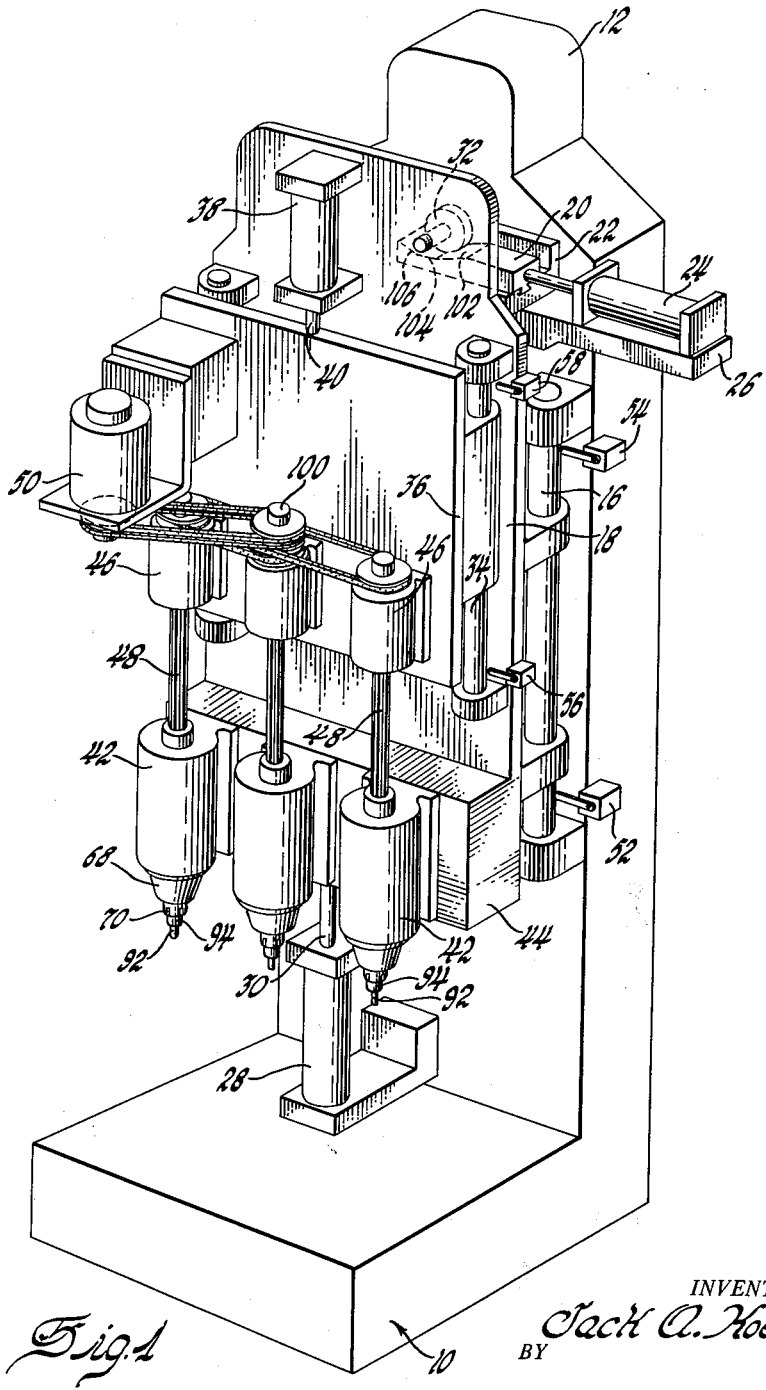
FIGURE 1 shows a multiple head machine embodying the invention herein disclosed.

The machine shown in FIGURE 1 is mounted on a horizontal base 10 and a vertical support 12. A fixture suitably adapted to hold a cylinder head may be attached to base 10. Vertical guide rods 16 are secured to vertical support 12 in spaced parallel relation, and main slide platen 18 is mounted for vertical movement thereon. Valve seat finishing control cam 20 is slidably mounted on support 12 for horizontal movement within slide 22. Cam actuating motor 24 is attached to one end of cam 22 and secured to support 12 by a mount 26. Base 10 provides reaction and support for main slide platen control motor 28. Piston rod 30 of motor 28 is attached to the lower end of platen 18. Control motor 28 may be hydraulically actuated to impart vertical movement to platen 18 along guides 16. Cam follower 32 is rotatably mounted on the upper end of platen 18 and adapted to engage cam 20 upon vertical downward movement of platen 18.

Parallel auxiliary guide rods 34 are secured to platen 18 and slidably support auxiliary slide platen 36 for vertical movement. Auxiliary slide control motor 38 is secured to platen 18 and is provided with a piston rod 40 which is connected to platen 36. When motor 38 is energized, platen 36 is moved a vertical direction relative to platen 18.

A plurality of valve finisher spindle housings 42 are secured in parallel spaced relation to the lower end of platen 18. A horizontally extending section 44 of platen 18 is provided for mounting housings 42. Reamer spindle bearing supports 46 are mounted in parallel spaced relation to platen 36. Supports 46 and housings 42 are axially aligned so that reamer spindles 48 may extend between them. Reamer spindles 48 are driven through a belt and pulley arrangement by motor 50 mounted on platen 36. Limit switches 52 and 54 may be appropriately secured to vertical support 12 for controlling engagement with platen 18 as hereinafter described. Other limit switches 56 and 58 may be mounted on platen 18 for engagement with platen 36 as further described.

Referring now to FIGURE 2, finisher spindle housing 42 is provided with thrust bearing 60 and rotatably supports finisher spindle 62. Oil seal 64, retained by cap 66, may be provided to hold lubricant within the bearing. Valve seat finisher tool holder 68 is secured to finisher spindle 62 as an axial extension thereof. Holder 68 is provided with finisher tool tips 70 and 72. Set screws 74 and 76 allow adjustment of the tips. At the time cylinder head 14 is placed in the fixture in proper location and clamped in position beneath the spindles, cam control motor 24 is holding cam 20 in an extreme left position as viewed in FIGURE 1. Cam 20 is provided with surfaces which are engageable by cam follower 32. Surface 102 controls the downward movement of platen 18, thereby controlling the feed of the valve seat finisher tips 70 and 72. Cam surface 104 allows a dwell period during which the valve seat finisher tips are not advanced, allowing a "clean-up" period. Cam surface 106 then actuates platen 18, causing it to move upward to give a slight clearance between valve seat 108 of cylinder head 14 and valve seat finisher tips 70 and 72.

The upper end of finisher spindle 62 has interior splines 78 formed therein. The upper end of reamer spindle 48 has external splines 80 formed thereon which slidably engage splines 78. The lower end of reamer spindle 48 is rotatably piloted in finisher spindle 62 and extends therethrough and beyond into chamber 82, formed in the upper end of holder 68. Reamer spindle 48 is internally bored to receive push rod 84 and collet insert 86. Insert 86 is held in place by retainer 88. Collet 90 is adapted to be held in place between push rod 84 and insert 86. Reamer 92 is slidably mounted in pilot 94 and ring 96, which is inserted in the outer bore 98 of pilot 94. Pilot 94 is secured in the lower end of holder 68. The upper end of push rod 84 is adjustably secured to reamer spindle 48 by an internally threaded cap 100 whereby axial pressure is brought to bear against collet 90, holding reamer 92 in position.

In operation, at the beginning of a cycle, cam 20 is held in an extreme left position as viewed in FIGURE 1. Main and auxiliary slide platens 18 and 36 are in the fully raised position. Cylinder head 14 is secured in proper alignment with spindles 62. Drive motor 50 is energized to rotate reamer 92 and holders 68. Main slide control motor 28 is energized to move main slide platen 18 downward. Cam follower 32 engages control cam 20 and sufficient pressure is maintained in main control motor 28 to keep cam follower 32 in engagement with cam 20. At this point, limit switch 52 is actuated and cam motor 24 is energized to move cam 20 to the right at a constant linear speed. Cam follower 32 rides down the inclined surface 102 of cam 20 and pressure in main control motor 28 forces platen 18 downward, engaging valve seat finisher tips 70 and 72 with cylinder head 14. The valve seat is turned and chamfered through a distance predetermined by cam 20 at which time the follower 32 is engaged by the dwell surface 104 of the cam. The finisher spindle 62 continues to rotate and valve seat 108 is cleaned-up. The cam reverse surface 106 then causes main slide platen 18 to be raised a slight amount, disengaging finisher tips 70 and 72 from valve seat 108.

Auxiliary slide control motor 38 is then energized and moves auxiliary slide platen 36 downward, extending reamer 92 into and through the valve stem guide hole 110, reaming hole 110 about the same axis around which the valve seat was finished. Limit switch 56 is then actuated, causing reversal of auxiliary guide motor 38 and main control motor 28. Reamer 92 is withdrawn from the valve stem guide hole as auxiliary slide platen 36 is lifted, and the valve seat finisher is withdrawn an additional distance from the valve seat as main slide platen 18 is lifted. Cam motor 24 is also reversed, returning cam 20 to its initial position. Limit switches 54 and 58 control the height to which the platens 18 and 36 are lifted.

The fixture holding cylinder head 14 may be shifted and tilted so that the operation can be performed on the inlet, then the exhaust valve seats and guides. The number of finishing and reaming units provided will depend upon the number of valve seats and guides to be finished in one operational cycle.

What is claimed is:

A mount and control mechanism for a pair of concentrically disposed and interrelated tool holders, said mechanism including a base and a first platen mounted for linear movement on said base and having one of said tool holders secured thereto and a second platen mounted for parallel linear movement on said first platen and having the other of said tool holders secured thereto and power means for imparting controlled movement to said platens, said power means including power operated cam control means and a cam follower on said first platen engageable with said cam control means for controlling the movement of said first platen and motor means for moving said first platen relative to said base and said second platen relative to said first platen, said cam control means including in series a tool holder feeding surface and a dwell surface and a reversing surface engageable in series by said cam follower, said power means having controls connected thereto and actuated by movement of said platens, said motor means first moving said first platen and said second platen therewith under control of said cam control means and said power means controls then actuated by movement of said first platen to move said second platen an additional distance in the same direction as the first movement of said first platen and stopping said second platen while said cam follower is engaged with the reversing surface of the cam control means, and then simultaneously reversing the movements of said cam control means and said second platen relative to said first platen and said first platen relative to said base.

References Cited in the file of this patent
UNITED STATES PATENTS

| | | |
|---|---|---|
| 511,872 | Ridwell | Jan. 2, 1894 |
| 1,594,903 | Grey | Aug. 3, 1926 |
| 1,799,594 | Lovejoy | Apr. 7, 1931 |
| 1,940,220 | McGrath | Dec. 19, 1933 |
| 2,027,385 | Kraut et al. | Jan. 14, 1936 |
| 2,131,845 | Nutt | Oct. 4, 1938 |
| 2,190,284 | Foshie | Feb. 13, 1940 |
| 2,813,280 | Huffman | Nov. 19, 1957 |
| 2,896,308 | Swords | July 28, 1959 |